United States Patent
Beach et al.

(10) Patent No.: US 6,583,241 B1
(45) Date of Patent: Jun. 24, 2003

(54) PROCESS FOR MAKING MVTR RESIN

(75) Inventors: David L. Beach, Kingwood, TX (US);
Charles D. Mills, Orange, TX (US);
Javier M. Mora, Houston, TX (US);
Mary A. Schexnayder, Beaumont, TX (US); James A. Solis, Groves, TX (US); Kevin J. Taylor, Orange, TX (US)

(73) Assignee: Chevron Phillips Chemical Company LP, Houston, TX (US)

( * ) Notice: Subject to any disclaimer, the term of this patent is extended or adjusted under 35 U.S.C. 154(b) by 0 days.

(21) Appl. No.: 09/808,801

(22) Filed: Mar. 15, 2001

Related U.S. Application Data

(60) Provisional application No. 60/190,732, filed on Mar. 20, 2000.

(51) Int. Cl.[7] .................................................. C08F 4/42
(52) U.S. Cl. .................... 526/160; 526/352; 526/104; 526/170; 526/943; 526/154; 526/130; 526/129; 502/117; 502/152
(58) Field of Search ................................. 526/352, 104, 526/170, 160, 943, 154, 130, 129; 502/117, 152

(56) References Cited

U.S. PATENT DOCUMENTS

| | | | | |
|---|---|---|---|---|
| 5,169,817 A | * | 12/1992 | Dawkins | 502/152 |
| 5,418,200 A | * | 5/1995 | Carney et al. | 502/117 |

* cited by examiner

*Primary Examiner*—David W. Wu
*Assistant Examiner*—Ling-Siu Choi
(74) *Attorney, Agent, or Firm*—Williams, Morgan and Amerson

(57) ABSTRACT

The present invention is directed to producing a resin which, when formed into a film, has excellent gas barrier and/or moisture barrier (low MVTR) properties. Further, the resin has a relatively high molecular weight distribution, preferably above 6, and has excellent processability/extrudability. The resin is produced using a cyclopentadienyl chromium compound, preferably a mono CpCr compound, on a support, preferably a silica support. A particularly preferred catalyst for use in the present invention comprises pentamethylcyclopentadienyidimethylchromiumpyridine. Preferably, the catalyst is used in a slurry polymerization process.

13 Claims, 1 Drawing Sheet

← Layer 1 (Skin Layer)
← Layer 2 (Core Layer)
← Layer 3 (Core Layer)
← Layer 4 (Core Layer)
← Layer 5 (Seal Layer)

PROCESS FOR MAKING MVTR RESIN

This application claims the benefit of U.S. Provisional Application No. 60/190,732, filed Mar. 20, 2000.

FIELD OF THE INVENTION

The present invention relates to a process for producing ethylene polymers having excellent resistance to moisture vapor transmission when the resin is formed into a film. Further, the process of the present invention produces MVTR resins which have ease of processing into a film packaging product.

The process of the present invention preferably uses a catalyst comprising a cyclopentadienyl chromium compound supported on a solid refractory material, in slurry or gas phase reaction conditions.

BACKGROUND OF THE INVENTION

Polymeric composition for uses such as food packaging and other applications where good barrier properties against moisture ingress have been known for many years. Use of HDPE (high density polyethylene) for this purpose is disclosed in Kirk-Othmer, 3rd Edition, page 489. However, many HDPE polymers are not readily processable, such as by extrusion, to form packaging products.

It is desirable to have an HDPE that has excellent moisture vapor transmission resistance (MVTR) and also is relatively easy to process into a packaging product, such as a film.

The general theory of permeation of a gas or liquid through a polymer film is that the permeation rate is the product of a diffusion term and a solubility constant of the gas-liquid in the polymer, each of which is often independent of the other. The process of permeation through a polymeric barrier involves four steps: absorption of the permeating species into the polymer wall; solubility in the polymer wall; diffusion through the wall along a concentration gradient; and desorption from the outer wall.

There are certain molecular structures that lead to good barrier properties in polymers. A practical problem, however, is that the property that might result in a good gas barrier very often also results in a poor water barrier. Polarity is a case in point. Highly polar polymers such as those containing many hydroxyl groups [poly(vinyl alcohol) or cellophane] are excellent gas barriers but also are among the poorest water barriers. In addition, they become poor gas barriers when plasticized by water. Conversely, very nonpolar hydrocarbon polymers such as polyethylene have excellent water barrier properties and poor gas barrier properties. It is generally thought that in order to be a truly good barrier polymer, the material must have: some degree of polarity such as contributed by a nitrile, ester, chlorine, fluorine, or acrylic functional groups; high chain stiffness; inertness; close chain-to-chain packing by symmetry, order, crystallinity, or orientation; some bonding or attraction between chains; high glass transition temperature ($T_g$).

In some prior instances, co-extruded film including a polyolefin layer and polar resin layer such as EVOH have been modified to improve water barrier properties by including other substances, such as a wax. Thus, according to U.S. Pat. No. 5,141,801, the barrier properties of a co-extruded film having a crystalline polyolefin surface layer can be improved substantially by incorporating a wax into the polyolefin. The film has an interior polymer layer that prevents migration of the wax to the other surface of the film so that wax does not interfere with the printability or heat sealability of the other surface. The wax-containing polyolefin layer also protects the interior layer from adverse effects of moisture, such as when the interior layer comprises EVOH. An interior layer of EVOH may be sandwiched between wax-containing polyolefin layers to fully protect it from moisture.

Major processes for producing PE resins, including HDPE, include solution polymerization, slurry polymerization and gas phase polymerization. Catalysts for these processes include Ziegler-Natta catalysts, Cr catalyst (either in homogeneous form or on a solid support), and, more recently, homogeneous or supported metallocene catalysts. The metallocene catalysts can be either mono or bis cyclopentadienyl (Cp) ligands on a transition metal, such as Ti, Zr, Hf, Cr, etc. The Cp ligands in turn can be substituted by various groups.

CpCr catalysts are disclosed in U.S. Pat. Nos. 5,240,895; 5,302,674; 5,320,996; 5,393,720; 5,399,634; 5,418,200; and 5,593,931.

U.S. Pat. No. 5,418,200, for example, discloses ethylene polymerization using various CpCr +3 valence compounds on a refractory support, such as silica. The '200 patent states that the polymers produced have a polydispersity or molecular weight distribution (MWD) greater than 10, and that the polymers have improved ease of processing, better melt behavior, and other desirable properties such as impact resistance and environmental stress crack resistance. Also, the '200 patent points out that large blow molded products are superior when made with high MWD polymers, and that film is more puncture resistant when made from polymer with a high MWD.

The '200 patent does not disclose MVTR properties for film made from the polymers produced per the '200 process.

WO 96/19527 (PCT/US95/16570) discloses polyethylene films of advantageous (low) MVTR, wherein the polyethylene resin used to make the film is produced using a metallocene catalyst. The metallocene catalysts are not specifically described in WO 96/19527, but reference is made to co-pending application U.S. Ser. No. 08/093,501 for disclosure of the metallocene catalysts useful in the '527 patent application.

According to the '527 patent application, the polyethylene resin has a density in the range of from about 0.935 to about 0.965 g/cm$^3$, a $M_w/M_n$ less than about 3, and an article made using the resin has a water vapor transmission rate less than 0.54 g·mil/100 in$^2$/day (0.183 g/mm/m$^2$/day), preferably less than 0.4 g·mil/100 m$^2$ day (0.135 g/mm/m$^2$/day).

Thus, the films made from the polyethylene according to the '527 patent application have a MWD or polydispersity below 3.

U.S. Pat. No. 5,183,792 is directed to producing polyolefin resin using a catalyst comprising chromium and titanium supported on silica. The polymer produced has a high melt index and a narrow molecular weight distribution (MWD). The narrow MWD is indicated in U.S. Pat. No. 5,183,792 as helpful in achieving a low MVTR. As stated in the '792 patent at column 4, lines 35–40: "The product will have a high melt index (MI) and a low high load melt index/melt index ratio (HLMI/MI) and, as is observed when these two properties are high and low respectively, a low water vapor transmission."

Also, in *Plastics Technology*, August 1999, in an article by J. Krohn et al. titled "Keep It Dry, Optimize Moisture Barrier in PE Films", at pages 60–61, the authors state "Thus, structure 3 excelled in barrier because it was the only one to have a skin layer of higher MI resin with narrower MWD, both of which contribute inherently to better barrier."

SUMMARY OF THE INVENTION

According to the present invention, a process is provided for making an ethylene homopolymer having a polydispersity above 4, and wherein the homopolymer is suitable for producing a film having a high barrier to transmission of water or gas, or both, which process comprises contacting ethylene with a catalyst comprising a cyclopentadienyl chromium hydrocarbyl compound on a solid support, under slurry or gas phase polymerization conditions.

The process of the present invention is especially advantageous in producing resins which have an MVTR less than 0.4, preferably less than 0.3, still more preferably below 0.25 grams of water per 100 square inches of film per day, for a 1 mil (one thousandth of an inch) thick film.

Preferably, the resins produced in accordance with the present invention have a polydispersity or MWD above 4, more preferably between 4.5 and 12, and most preferably between 4.7 and 7.5.

Preferred catalysts for use in the process of the present invention are mono or bis cyclopentadienyl chromium compounds, more preferably a mono cyclopentadienyl, on a solid support. Preferably, mono cyclopentadienyl contains one or more substituents. Preferred substituents are hydrocarbyl groups; particularly preferred is cyclopentadienyl substituted with five methyl groups. Preferably the solid support is silica. An especially preferred catalyst for use in the process of the present invention is pentamethyl CpCr $(CH_3)_2$Pyr on a solid support, where Cp represents cyclopentadienyl, and Pyr represents pyridine. Preferred co-catalysts are alumoxanes, especially isobutyl alumoxane (IBAO). Preferred catalysts for use in the present invention are described in more detail below.

We have found that use of catalysts such as the aforementioned especially preferred catalyst, under process conditions as described herein, produces substantially. linear polyethylene of density at least 0.955 g/cc, with nearly all of the terminal groups of the polyethylene polymer saturated. Preferably, the process conditions are selected to allow the catalyst to react under mechanisms that produce predominately saturated end groups, that is, the methyl end group to olefin end group ratio relatively high, at least 10, and preferably greater than 15, as measured by FTIR (Fortier Transform Infrared spectroscopy).

Preferred process conditions, particularly when using the aforementioned especially preferred catalyst, include polymerization reaction zone temperature between 50° C. to 100° C., more preferably 70° C. to 90° C., with a slurry ethylene concentration of 8–15 weight percent. Hydrogen is a preferred chain transfer agent.

Other particularly preferred process conditions are related to the extrusion and pelletization process, and the film process.

Ideal compound conditions, or pelletization process are those that do not alter the chemical structure of the polymer; preferably cross-linking or long chain branching are kept to minimum.

Among other factors, the present invention is based on our finding that unexpectedly low MVTRs can be achieved from relatively high MWD resins, greater than 4 MWD, wherein the resin is produced from CpCr catalysts as described in more detail below. The resins produced by the process of the present invention have excellent processability while still achieving excellent MVTR properties.

DETAILED DESCRIPTION OF THE INVENTION

Figure 1:
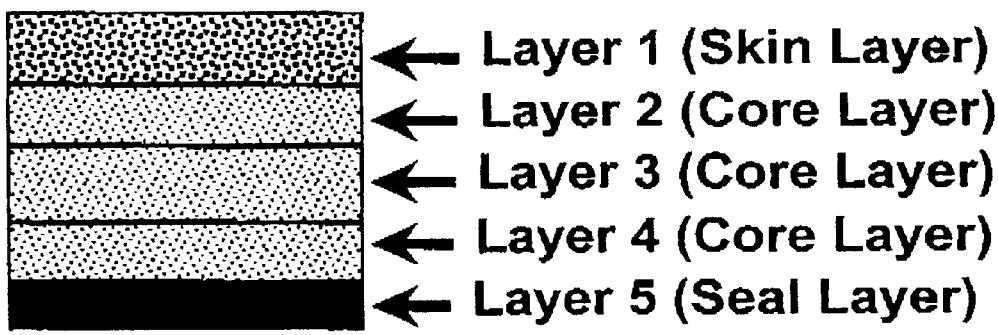
FIG. 1 is a schematic diagram showing a film of five layers that may be used in an application requiring low moisture vapor transmission rate (low MVTR).

One important aspect of the present invention is the achievement of a process for producing a polyolefin resin which, when formed into a film, has a low MVTR, while also achieving particularly attractive processing characteristics for the resin.

MVTR (Moisture Vapor Transmission Rate) or WVTR (Water Vapor Transmission Rate), as it is sometimes called, is determined for a resin in a two-step process (three-step if one includes the pelleting step for the resin fluff from the reactor), involving extrusion and measurement. Resin produced in a slurry or gas phase process is first compounded into pellets which are extruded into film using a blown or cast film extrusion method. Since extrusion conditions have a significant effect on the MVTR exhibited, extrusion temperatures, extruder output rates, cooling rates, film gauge, and, in the case of blown film, blow-up ratio, are controlled during extrusion of the resin and held constant when comparing the MVTR properties of two or more resins.

Following the extrusion of the resin into film, the actual measurement of MVTR is performed using a Mocon Permatran-W3/31 MVTR testing system, or equivalent. The Mocon instrument for measuring water permeability was developed by Modern Controls, Inc. To accomplish the MVTR measurement, a 10×10 cm sample is cut from a random area of the film. The sample is then mounted in a sample test cell and placed in the Mocon Permatran W3/31 unit. In the unit, the test film is exposed to a constant continuous flow of dry nitrogen gas across one side of the film, exhaust side, and a constant continuous flow of controlled humidity nitrogen gas across the other side, carrier side. Water vapor passes from the humidified nitrogen side of the test cell through the film and into the dry nitrogen side of the test cell. A modulated infrared photodetection system on the exhaust side of the test cell measures the variation in the absorption of infrared energy caused by the water vapor which has transmitted through the film. By comparing the amplitude of the output signal obtained from the infrared photodetection system mounted on the test cell with the amplitude of a signal from a reference cell in the same instrument containing a film with a known transmission rate, the transmission rate of the test film is determined.

By convention, the value obtained for MVTR is expressed as grams of water transmitted per 100 square inches per one mil (one thousandth of an inch) thickness in a 24-hour period (or, in metric system, grams of water transmitted per square meter per mm thickness in a 24-hour period).

The resins produced by the process of the present invention have a relatively high MWD. MWD is the ratio of the weight average molecular weight ($M_w$) to the number average molecular weight.

Preferred means of determining $M_n$ and $M_w$ is by Gel Permeation Chromatography (GPC) which is also commonly known as Size Exclusion Chromatography (SEC). For the purpose of references to $M_n$ and $M_w$ in this application, molecular weight is determined using a Waters 150° C. liquid chromatograph, three linear mixed bed chromatographic columns, and hot carrier solvent of 1, 2, 4 trichlorobenzene (TCB) at 150° C. temperature. The GPC elution volume is converted to the linear-equivalent polyethylene molecular weight (M) by way of a standard calibration method using a high-density linear polyethylene standard of known $M_w$, $M_n$ values and a broad molecular weight distribution. Equation (1) below is used to calculate the polymer weight fraction (W) of different molecular weights existed in the GPC effluent as detected by an online differential refractomer signal (RI). Equations (2) and (3) are used to calculate the $M_w$ and $M_n$ values of any unknown sample using the predetermined M values from the GPC calibration curve.

$$(W)i = \frac{(RI)i}{\sum (RI)i} \quad (1)$$

$$Mw = \left[\frac{\sum Mi*(W)i}{\sum (W)i}\right] \quad (2)$$

$$Mn = \left[\frac{\sum (W)i}{\sum (W/M)i}\right] \quad (3)$$

Another important aspect of the present invention is the catalyst which is used for forming the MVTR resin. As indicated above, the preferred catalyst used in the present invention is a cyclopentadienyl chromium compound on a support.

As used herein, the term "cyclopentadienyl" refers to unsubstituted cyclopentadienyl. However, the cyclopentadienyl ring may contain one or more substituents, preferably substituents which do not interfere with the Cr (chromium) compound's ability to function as an alpha-olefin polymerization catalytic site. Examples of substituted cyclopentadienyl include pentamethylcyclopentadienyl, methylcyclopentadienyl, t-butylcyclopentadienyl, and pentaphenylcyclopentadienyl, as well as compounds where the substituent forms a multi-cyclic ring with the cyclopentadienyl ring. Examples of these multi-cyclic rings include indenyl and fluorenyl rings. For the sake of simplicity, the abbreviation "Cp" will be used herein to refer to unsubstituted cyclopentadienyl. However, substituted Cp groups, including indenyl, which in turn may be substituted, are preferred for use in the present invention. Pentamethylcyclopentadienyl is an especially preferred substituted Cp. Indenyl is treated as a substituted Cp for purposes of the present patent application.

Preferably, the Cr metal atom in the CpCr compound has an oxidation state of +3 in the catalyst as produced.

Preferably, these CpCr compounds have, in addition to one cyclopentadienyl group, at least one hydrocarbyl group bonded to the metal atom. As used herein, the term "hydrocarbyl" refers to alkyl, alkenyl, aryl, aralkyl and alkaryl radicals and the like. Exemplary hydrocarbyl radicals include, but are not limited to, methyl, ethyl, propyl, butyl, amyl, isoamyl, hexyl, neopentyl, isobutyl, heptyl, octyl, nonyl, decyl, cetyl, phenyl, benzyl, and other similar groups. Additionally, organosilyl groups, such as trimethylsilyl methyl, i.e., $(CH_3)_3SiCH_2-$, and the like can be used. If more than one hydrocarbyl group is bonded to the metal atom, they can be independent or linked, i.e., they can form a 3-, 4-, 5-, 6-, 7-membered metallocycle. Preferably, the hydrocarbyl group is sigma bonded to the Cr metal. Other functional substituents which may be used on the Cp include ER, where E=O, or S; $ER_2$, where E=B, N, or P; and $SiR_3$. R is an organic moiety.

In addition to the cyclopentadienyl and hydrocarbyl groups, the Cr compounds used in the present invention may also contain one or more sigma donor stabilizing ligands. These ligands contain an atom, such as oxygen, nitrogen, phosphorus or sulfur, which has a non-bonded electron pair. Examples of these ligands include, but are not limited to, ethers, amines, phosphines and thioethers. Ethers such as tetrahydrofuran (THF) and amines such as pyridine are preferred. Compounds with pyridine are most preferred for use in the process of the present invention.

Examples of the Cr compounds useful in this invention include, but are not limited to, compounds having the following general formulas:

$$(C_5(R')_5)_a CrX_b L \quad (I)$$

$$[(C_5(R')_5)_a CrX_b]_c \quad (II)$$

or $$[(C_5(R')_5)_a CrX_b(L)_m]+[A]- \quad (III)$$

wherein $(C_5(R')_5)$ is a cyclopentadienyl or substituted cyclopentadienyl ring;

R' is at each independent occurrence hydrogen, a hydrocarbyl radical having 1–20 carbon atoms, or adjacent R' groups may together form one or more rings;

X is a hydrocarbyl radical having 1–20 carbon atoms (for example, a monovalent saturated aliphatic or alicyclic radical or a monovalent aromatic radical, or combinations thereof; X, in addition, may be a monovalent hydrocarbyloxy, amido, phosphido or sulfido radical or combinations thereof:

a=1 or 2, b=1 or 2 where a+b=3;

c=1 or 2 with the proviso that when c=2 then X is alkyl;

L is at each independent occurrence a sigma donor stabilizing ligand;

m=1 to 2 inclusive; and

A is an anion.

Examples of compounds having Formula (I) above include, but are not limited to, pentamethyl $CpCr(CH_3)_2$ (THF), pentamethyl $CpCr(Bzyl)_2$(THF), pentamethyl CpCr $(Bzyl)_2$(Pyr), pentamethyl $CpCr(CH_3)_2$(Pyr), pentamethyl $CpCr(TMSM)_2$(Pyr), pentamethyl $CpCr(TMSM)_2$, pentamethyl $CpCr(CH_3)_2$(DMAP), pentamethyl $CpCr(CH_3)_2$ $(PMe_2Ph)$, pentamethyl $CpCr(CH_3)_2$(3,5-Lutidine), and pentamethyl $CpCr(CH_3)_2$(DMAP), where Bzyl is benzyl, Pyr is pyridine, TMSM is trimethylsilylmethyl, DMAP is N,N-dimethylaminopyridine, and $PMe_2Ph$ is dimethylphenylphosphine.

Further examples of the Cr compounds preferred for use in the process of this invention include monomeric Cr compounds, dimeric Cr compounds, and cationic Cr compounds. A preferred monomeric Cr compound is pentamethyl $CpCr(Bzyl)_2$(THF), [pentamethyl $CpCr(CH_3)_2]_2$ is a preferred dimeric compound, and a preferred cationic-compound is [pentamethyl $CpCrCH_3(THF)_2]+[BPh_4]-$. Especially preferred compounds are pentamethyl CpCr $(CH_3)_2$(Pyr), pentamethyl $CpCr(CH_3)_2$(3,5-Lutidine) and pentamethyl $CpCr(CH_3)_2(PMe_2Ph)$.

Several articles, namely, Theopold, *J. Am. Chem. Soc.* (1988) 110, 5902 "Cationic Chromium (III) Alkyls as Olefin Polymerization Catalysts", Theopold, *Acc. Chem. Res.* (1990), 23, 263 "Organochromium (III) Chemistry: A Neglected Oxidation State", and Thomas et al., *J. Amer. Chem. Soc.*, 113 (1991), p. 893 et seq. (all of which are incorporated herein by reference) describe syntheses useful in making some of the Cr compounds useful in the process of this invention. Similar procedures can be used to make related compounds.

In preferred catalyst systems used in the process of the present invention, an organo chromium compound is deposited on an inorganic support. Suitable inorganic metal oxide supports include silica, alumina, silica-alumina mixtures, thoria, zirconia, magnesium oxide and similar oxides. Suitable inorganic metal phosphates include aluminum phosphate, zirconium phosphate, magnesium-containing alumina phosphate and alumina aluminum phosphate. Silicas, aluminum phosphates and alumina aluminum phosphates are preferred. Suitable silica supports include Davison 952, Davison 948, MS 3030 and MS 3050, Crosfield EP-10 and Crosfield EP17MS. Further examples of useful supports are the following: alumina aluminum phosphates with aluminum to phosphorus ratios of about 5:1 to 1:1 as disclosed in U.S. Pat. Nos. 4,080,311 and 4,219,444; magnesia-alumina-aluminum phosphates as described in U.S. Pat. No. 4,210,560; zinc oxide-cadmium oxide-alumina-aluminum phosphates such as those disclosed in U.S. Pat. No. 4,367,067; and the calcium, barium, and/or strontium oxide-alumina-aluminum phosphates described in U.S. Pat. Nos. 4,382,877 and 4,382,878. The acidity of these supports can be adjusted by judicious inclusion of basic metals such as alkali and alkaline earth metals (Ca, Be, Mg, K, Li) to counteract excessive acidity. Other useful supports include magnesium halides, particularly magnesium chloride, such as those described in "Transition Metals and Organometallics as Catalysts for Olefin Polymerization" (1988, Springer-Verlag) edited by W. Kaminsky and H. Sinn and "Transition Metal Catalyzed Polymerizations-Ziegler-Natta and Metathesis Polymerizations" (1988, Cambridge University Press) edited by R. Quirk.

The supports useful in this invention should have a high surface area. In general, these supports should have characteristics listed in the following table:

| Property | Broad Range | Preferred Range | More Preferred Range |
| --- | --- | --- | --- |
| Surface area, $m^2/g$ | 25–600 | 100–400 | 250–350 |
| Pore volume, $cm^3/g$ | 0.25–4 | 0.7–3 | 1.5–2.0 |
| Mean particle diameter, microns | 20–200 | 25–140 | 30–70 |

Preferably, the pore size distribution is narrow, with a significant percentage of the pores in the range 150–200 Angstroms. It is also desirable that the support be substantially anhydrous before the Cr compound is deposited on it. Thus, it is desirable to calcine the support prior to deposition of the Cr compound.

The supported catalysts used in this invention are readily prepared by techniques known in the art. For example, a solution of the Cr compound in aliphatic, aromatic or cycloaliphatic hydrocarbons, or ethers such as diethyl ether or tetrahydrofuran can be stirred with the support until the Cr compound is adsorbed on or reacted with the support. The amount of Cr compound relative to the amount of support will vary considerably depending upon such factors as the particle size of the support, its pore size and surface area, the solubility of the Cr compound in the solvent employed, and the amount of Cr compound which is to be deposited on the support. However, in general, the amount of Cr compound used is adjusted so that the final metal content (calculated as the element), relative to the support, is in the range of from about 0.01 to about 5 weight percent. In most cases, the most desirable level is in the range of about 0.1 to about 1.5 weight percent.

The activity of many of the supported Cr compounds used in the process of this invention is significantly increased when they are employed in conjunction with a co-catalyst. The co-catalysts Useful in the practice of the present invention are Group 2 and Group 3 metal alkyls. As used herein, the term "Group 2 and Group 3 metal alkyls" refers to compounds containing a metal from Group 2 or Group 3 of the Periodic Table (such as Mg, Zn, B or Al) to which is bonded at least one alkyl group, preferably a $C_1$ to $C_8$ alkyl group. Suitable Group 2 and Group 3 metal alkyls include dialkyl magnesium, dialkyl zinc, trialkylboranes, and aluminum alkyls. Suitable aluminum alkyls include trialkylaluminums (such as trimethylaluminum, triethylaluminum, triisobutylaluminum and trioctylaluminum). Trialkylaluminum with alkyl groups of four carbons or greater are preferred. Other aluminum alkyls useful in the practice of the present invention include alkylaluminum alkoxides (such as diethylaluminum ethoxide and ethylaluminum diethoxide), and alkylaluminum halides (such as diethylaluminum chloride, diethylaluminum bromide, diethylaluminum iodide, diethylaluminum fluoride, ethyl aluminum dichloride, ethyl aluminum dibromide, ethyl aluminum diiodide, ethyl aluminum difluoride, and ethyl aluminum sesquichloride).

Preferred aluminum alkyls are aluminoxanes, including those represented by the general formula $(R-Al-O)_n$ for the cyclic form and $R(R-Al-O)_n AlR_2$ for the linear form. In these formulas, R is, at each independent occurrence, an alkyl group (such as methyl, butyl, isobutyl and the like) preferably with more than two carbon atoms, more preferably with 4–5 carbon atoms, and n is an integer, preferably from 1 to about 60. Most preferably, R is an isobutyl group. Mixtures of linear and cyclic aluminoxanes may also be used. Examples of aluminoxanes useful in this invention include, but are not limited to, ethyl aluminoxane, isobutyl aluminoxane, and methyl aluminoxane, and mixtures thereof. Aluminoxanes (also known as "alumoxanes") suitable for use in this invention are described in Pasynkiewicz, "Alumoxanes: Synthesis, Structure, Complexes and Reactions," Polyhedron 9, p. 429 (1990), which is incorporated by reference herein in its entirety.

The preferred Group 2 and Group 3 metal alkyls are aluminoxanes and the trialkylaluminums.

When used, the Group 2 and Group 3 metal alkyls are used in a Group 2 or Group 3 metal alkyl to Cr compound mole ratio of from about 1:1 to about 1000:1. The preferred mole ratio is from about 1:1 to about 100:1.

The process of the present invention may be carried out in either solution, slurry or gas phase polymerization processes, and preferably is carried out in a slurry or gas phase process. After the catalyst has been formed, the polymerization reaction is conducted by contacting the monomer charge with a catalytic amount of the catalyst at a temperature and at a pressure and ethylene concentration sufficient to initiate the polymerization reaction. As indicated above, preferably substantially linear polyethylene is produced in the present invention. For a slurry process, an organic solvent may be used as a diluent and to facilitate heat transfer. The polymerization reaction is carried out at temperatures of from about 30° C. or less up to about 250° C. or more, depending on the equipment design and on the operating pressure, and the particular catalyst being used. Preferably, the temperature is from about 60° C. to about 125° C., more preferably 60° C. to 100° C. The pressure is dependent on ethylene concentration and is sufficient to initiate the polymerization of the monomer charge, and can be from atmospheric up to about 1000 psig, more preferably about 20 to about 800 psig. For a slurry or solution polymerization, the ethylene concentration in the range of 4–20 weight percent of the solvent or diluent phase is preferred.

When the catalyst is used in a slurry or solution type process, an inert solvent or diluent medium is used. The solvent or diluent should be one which is inert to all other components and products of the reaction system, and be stable at the reaction conditions being used. It is not necessary, however, that the inert organic solvent medium also serve as a solvent for the polymer produced. The inert organic solvents which may be used include saturated aliphatic hydrocarbons (such as hexane, heptane, pentane, isopentane, isooctane, purified kerosene and the like), saturated cycloaliphatic hydrocarbons (such as cyclohexane, cyclopentane, dimethylcyclopentane, methylcyclopentane and the like), aromatic hydrocarbons (such as benzene, toluene, xylene and the like), and chlorinated hydrocarbons (such as chlorobenzene, tetracholoethylene, o-dichlorobenzene and the like). Particularly preferred solvents or diluents are isobutane, cyclohexane, hexane and heptane.

When the catalyst is used in a gas phase process, preferably it is suspended in a fluidized bed with, e.g., ethylene. Temperature, pressure and ethylene flow rates are adjusted to maintain acceptable fluidization of the catalyst particles and resultant polymer particles. Further descriptions of such a fluidized bed may be found in British Patent 1,253,063, to Karapinka, which is incorporated by reference herein.

Figure 2:
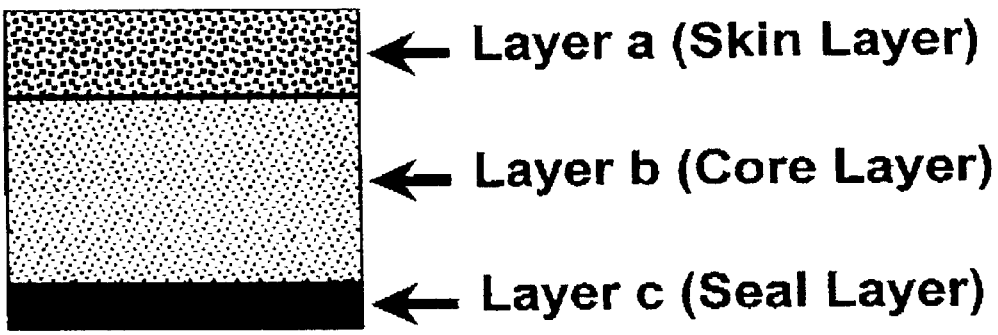
FIG. 2 is a schematic diagram showing a three-layer film that may be used in an application requiring low moisture vapor transmission rate (low MVTR).

The resin produced by the process of the present invention is used to produce a film. Referring now to FIGS. 1 and 2, two alternate preferred product MVTR film constructions are shown. FIG. 1 is a five-layer coextruded MVTR film construction. FIG. 2 is a three-layer coextruded MVTR film. Known means may be used for coextruding resin to form the respective layers of the coextruded MVTR film illustrated in FIGS. 1 and 2. Also, the resin produced in accordance with the process of the present invention may be used in a monolayer.

One advantage we have found for the resins produced in accordance with the present invention is that they may be advantageously used to form film of low MVTR. Further, the resins produced in accordance with the present invention are advantageous in that the same resin may be used for the skin layer of the coextruded construction and the core layer(s). In typical prior art, a higher (2 g/10 min or higher) melt index HDPE resin is used in the skin layer of the construction and a lower (less than 1.5 g/10 min) melt index HDPE resin is used in the core layer(s) in order to achieve lower MVTR than a film using the lower MI in both the skin and core layers.

Referring now to FIGS. 1 and 2, two alternate preferred product MVTR film constructions are shown. FIG. 1 is a five-layer coextruded MVTR film construction. FIG. 2 is a three-layer coextruded MVTR film. Known means may be used for coextruding resin to form the respective layers of the coextruded MVTR film illustrated in FIGS. 1 and 2. Also, the resin produced in accordance with the process of the present invention may be used in a monolayer film. However, commercially viability of monolayer applications is generally dependent on heat sealing qualities of HDPE. Applications of the resin produced by the present invention can be made to produce a monolayer film for barrier properties which when laminated to other films or paper to make a finished product, such as a packaging product.

One advantage we have found for the resins produced in accordance with the present invention is that they may be advantageously used to form film of low MVTR. Further, the resins produced in accordance with the present invention are advantageous in that the same resin may be used for the skin layer of the coextruded construction and the core layer(s). In typical prior art, a higher (2 g/10 min or higher) melt index HDPE resin is used in the skin layer of the construction and a lower (less than 1.5 g/10 min) melt index HDPE resin is used in the core layer(s) in order to achieve lower MVTR than a film using the lower MI in both the skin and core layers.

FIG. 1 illustrates a preferred five-layer construction. The outer layer or outside skin of the film is layer 1. The core layers are layers 2, 3 and 4. The inside layer, which is referred to as the seal layer, and may come into contact with foodstuffs, is layer 5. Preferably, layer 1 is 10% to 20% of the total thickness, layers 2, 3 and 4 preferably are 60% to 80% of the thickness, and layer 5 is 10% to 20% of the thickness of the product film.

As referenced in the August 1999 issue of *Plastics Technology* in the article "Keep It Dry" and from common knowledge in the MVTR film market, in the five-layer construction, Layer 1, the skin layer or outside layer of the film is generally a HDPE having a melt index of between 2 and 6 g/10 min. The three core layers, Layers 2, 3 and 4 in the figure, generally consist of a HDPE having a melt index between about 0.5 and 1.5, preferably approximately 1.0 g/10 min. The core layers can be fed by three separate extruders or may be formed by splitting the stream from one extruder into two or three independent layers prior to or inside the die. As mentioned above, layer 5 in FIG. 1 is the seal layer in the coextruded construction. The seal layer may consist of a single resin, such as a high ethylene vinyl acetate copolymer or may be a blend of several resins. Resins used in the seal layer generally demonstrate a low crystallinity and as such do not appreciably contribute to the MVTR performance of the film.

FIG. 2 illustrates an alternate preferred construction, which is three layers. The outer layer or outside skin of the film in FIG. 2 is layer a. The core layer is layer b. The inside layer, which is referred to as the seal layer, and may come in contact with foodstuffs, is layer c. Preferably, layer a is 10% to 20% of the total thickness, layer b preferably is 60% to 80% of the thickness, and layer c is 10% to 20% of the thickness of the product film.

As is the case in the five-layer construction, the three-layer construction generally utilizes a 2 to 6 g/10 min. melt index HDPE, layer a in FIG. 2, in the skin layer. The core layer in the three-layer construction, layer b, is a HDPE generally having a melt index of about 0.5 to 1.5, preferably about 1.0 g/10 min. The seal layer, layer c, in the three-layer construction generally utilizes the same type of resins and resin blends commonly found in the five-layer construction.

An unexpected advantage we have found for the resins produced by the present invention is that the same grade HDPE may be used for both layer a and layer b in the three-layer construction and in layers 1, 2, 3 and 4 and achieve substantially equivalent barrier properties to the conventional systems requiring different grades of HDPE in the skin and core layer(s). Using the same grade HDPE is attractive for film manufacturers for convenience in both production of film and the inventory of resin. Since a HDPE resin produced by the present invention eliminates the need for a separate skin and core layer HDPE resin, film processors can reduce the number of HDPE resins they must inventory and the need for tracking two different HDPE resins within the transfer systems of the plant is eliminated.

We have found that, using the resin produced in accordance with the present invention, the high MI outside skin (layer a in the three-layer coextrusion and layer 1 in the five-layer coextrusion) of 2 MI or greater per the prior art can be replaced by an approximately 1 MI HDPE resin produced in accordance with the present invention. And, the same 1 MI resin can be used for the core layers, and yet still achieve attractive performance, such as low MVTR for the overall film.

The following examples are intended to further illustrate the present invention.

EXAMPLES

Example 1

A preferred catalyst for use in the process of the present invention is prepared as follows: The pentamethyl CpCr $(CH_3)_2(Pyr)$ was prepared following the general description contained in Noh, S. K.; Sendlinger, S. C.; Janiak, C.; Theopold, K. H., *J. Am. Chem. Soc.* (1989), 111, 9127. Lithium cyclopentadienide (0.380 g, 2.67 mmol) was added slowly to a slurry of 1.00 g (2.67 mmol) of $CrCl_3(THF)_3$ in 50 mL of THF. The resulting blue solution was stirred for 2 hours. Pyridine (0.222 g, 2.80 mmol) was added resulting in the deposition of a light blue solid. Stirring was continued for 1 hour after which was added (dropwise) 2.0 equivalents (3.80 mL of 1.4M solution in $Et_2O$) of methyllithium. The dark green-brown solution was stirred an additional 0.5 hr. and then taken to dryness under vacuum. The dark solid was extracted into pentane, filtered to remove metal halides, and taken dryness. The remaining solid was re-extracted into pentane, filtered, and the solvent was reduced until microcrystals appeared. The dark brown solution was kept at −40° C. overnight resulting in the deposition of black crystals. The crystals were collected and dried under vacuum. Silica (Davison 948) activated at 700° C., 300 g was charged to a flask and 1600 ml heptane was added in an inert atmosphere. The contents are heated to 70° C. with mechanical stirring to form a silica slurry.

Then 15 g of the pentamethyl $CpCr(CH_3)_2(Pyr)$ was added in 2–3 g aliquots to the silica slurry over the course of 1 hour. The contents of the flask was stirred for 12 hrs. at 70° C. The contents of the flask were cooled to room temperature and filtered with a fritted glass filter. The solid was dried on the filter under vacuum at 40–45° C. for 4 hrs. and further dried an additional 10–12 hrs. by passing argon up through the fritted filter at 40–45° C. The solid catalyst was then transferred to a receiving vessel.

Example 2

Gas Phase

Supported CpCr catalyst, as described in Example 1, was introduced continuously into a 24-inch outside diameter gas phase fluid bed polymerization reactor to polymerize ethylene. Isobutyl aluminoxane (IBAO) was fed to the reactor as a co-catalyst at various Al:Cr ratios including at an atomic ratio of (Al/Cr) of eight. Hydrogen was fed to the reactor to assist in control of the molecular weight of the polyethylene product. The reactor operating conditions were:

| | |
|---|---|
| Polymerization Temperature | 210° F. |
| Polymerization Pressure | 300 psig |
| Ethylene Pressure | 260 psi |
| Gas Phase $H_2/C_2{=}$ Molar Ratio | 0.025 |
| IBAO Feed Al/Cr Molar Ratio | 8 |
| Production Rate PE | 22 lbs/hr |

The resulting polyethylene product had a density of 0.9640 g/cc, a MI of 0.67 g/10 min, and a melt flow ratio (MFR) of 109.

We have found that resins with low MVTR are produced in accordance with the present invention using gas phase; however, slurry (liquid) phase reaction conditions are preferred as described in the next example.

Example 3

Slurry Polymerization

Slurry polymerization of ethylene in isobutane was carried out in a high pressure pilot plant equipped with a 50-gal loop reactor operated in a continuous mode at a pressure of 600 psig and temperature of 180° F. to 200° F. Operating conditions and product properties are described further below and summarized in Tables A and B below.

The catalyst as prepared in Example 1 was continuously injected as an isobutane slurry to the bottom of the loop. The co-catalyst, isobutylalumoxane, IBAO, was continuously metered as a 0.8 wt. % solution in hexane or isopentane at a rate of 100 to 300 cc/hr into the catalyst feed line to provide a 15 to 45 seconds pre-contact and reaction time prior to flowing into the loop reactor.

Ethylene and hydrogen were continuously metered into an isobutane feed at the top of the loop. An additional isobutane feed stream was maintained across the face of the circulating pump.

The reaction slurry was circulated at a rate of 2300 gal/min via a Sultzer Bingham circulating pump. Slurry was discharged from the loop via a letdown valve operated by pressure control, 585 to 600 psi differential.

The slurry leaving the loop passed into a flash stage for primary removal of isobutane, ethylene, and hydrogen and into a rotary drier stage for final degassing and transport into collection drums. Gas from the flash stage was continuously analyzed for its makeup. The solid catalyst injection quantity was adjusted to control the desired ethylene content in the reactor at 4 to 10 wt. % based on a constant quantity of ethylene and isobutane feed and to maintain a constant production rate of polyethylene. Polyethylene molecular weight was controlled by the hydrogen concentration in the isobutane. The hydrogen feed was adjusted to maintain a constant ratio of hydrogen to ethylene in the reactor, as measured by the gas composition in the flash tank. The polymerization product, the polyethylene fluff, was chemically characterized according to the following methods.

The Melt Index was used as a measure of molecule weight and MFR was used as a measure of MWD. MFR was measured according to ASTM 1238-90b as a function of MI and a HLMI. MFR is the ratio of HLMI to MI. HLMI and MI are determined in accordance with the currently approved ASTM method.

The density of the fluff and pellets was determined in accordance with ASTM 1928-90. GPC was used for both fluff and pellets to measure molecular weights as $M_w$, $M_n$, and MWD. Melting points were determined by DSC according to ASTM E 794.

The polyethylene fluff was compounded with an antioxidant, Irganox (registered trademark of Ciba-Geigy) B9355FF, at a level of 400 to 880 ppm weight, into pellets on a Werner Pfleiderer 30 mm twin screw extruder. The typical conditions for pelletization include oxygen exclusion via a nitrogen purge, 55 lbs/hr rate, 200 rpm screw speed; temperature (°F) profile over zones 1–6 at 200, 300, 350, 400, 450. The water bath was maintained at near ambient conditions. The pellets were formed into film and the film samples tested according to ASTM F 1249, for MVTR, as reported in Table B.

TABLE A

| | Operating Conditions and Resin Properties | | | | | | | | | |
|---|---|---|---|---|---|---|---|---|---|---|
| Run # | Temp °F. | $iC_4$ lbs/hr | $C_2$ lbs/hr | IBAO cc/hr | $C_2$ wt. % | $H_2/C_2$ mol %/wt. % | Cat Base/Cr, wt. % | MI | MFR | PE, rate lbs/hr |
| 1 | 190 | 65 | 30 | 600 | 8.0 | 0.0020 | MS3030/1.0 | 1.1 | 53 | 25 |
| 2 | 185 | 65 | 30 | 300 | 9.0 | 0.0019 | DAV948/0.8 | 1.1 | 45 | 25 |
| 3 | 205 | 65 | 30 | 300 | 8.0 | 0.0019 | DAV948/0.8 | 1.0 | 57 | |
| 4 | 190 | 65 | 30 | 300 | 8.4 | 0.0019 | DAV948/0.8 | 1.0 | 50 | |

TABLE B

| | | | | | Resin, Pellet and Film Data | | | |
|---|---|---|---|---|---|---|---|---|
| Run # | Mn | Mw | MWD | P g/cc | Cr/Al ppm/ppm | MVTR | FTIR Methy/Vinyl | MVTR % Control |
| 1 | 21,500 | 123,000 | 5.7 | 0.963 | 0.8/13 | 0.226 | | 17.8 |
| 2 | 23,800 | 120,000 | 5.0 | 0.962 | <0.1/12 | 0.249 | 21 | 8.5 |
| 3 | 18,800 | 132,000 | 7.0 | 0.962 | 1.4/10 | 0.236 | | 15.2 |
| 4 | 21,900 | 120,600 | 5.5 | 0.963 | 0.4/12 | 0.258 | 17.8 | 15.5 |

What is claimed is:

1. A process for making an ethylene homopolymer having a polydispersity above 4, and wherein the homopolymer is suitable for producing a film having an MVTR below 0.4, which comprises contacting ethylene with a catalyst comprising a cyclopentadienyl chromium hydrocarbyl compound on a solid silica support, under slurry or gas phase polymerization conditions, wherein the weight percent of chromium on the solid silica support is between 0.5 and 1.5.

2. The process in accordance with claim 1 wherein the film has an MVTR below 0.3.

3. The process in accordance with claim 1 wherein the film has an MVTR below 0.25.

4. The process in accordance with claim 1 wherein the polydispersity is above 6.

5. The process in accordance with claim 1 wherein the polydispersity is above 7.

6. The process in accordance with claim 1 wherein the cyclopentadienyl chromium hydrocarbyl compound is in cationic form.

7. The process in accordance with claim 1 wherein the chromium is in an oxidation state of +3.

8. The process in accordance with claim 1 wherein the catalyst includes a co-catalyst comprising an aluminoxane.

9. The process in accordance with claim 8 wherein the co-catalyst comprises isobutyl aluminoxane.

10. The process in accordance with claim 1 wherein the polymerization is carried out under slurry condition.

11. The process in accordance with claim 1 wherein the chromium compound has the formula:

$$(C_5(R')_5)_a CrX_b(L) \qquad (I)$$

$$((C_5(R')_5)_a CrX_b)_c \qquad (II)$$

or $$((C_5(R')_5)_a CrX_b(L)_m)^+(A)^- \qquad (III)$$

wherein ($C_5(R')_5$) is a cyclopentadienyl or substituted cyclopentadienyl ring; R' is at each independent occurrence hydrogen or a hydrocarbyl radical having 1–20 carbon atoms, wherein adjacent R' groups may together form one or more rings;

X is a hydrocarbyl radical having 1–20 carbon atoms;

a=1 or 2, b=1 or 2 where a+b=3;

c=1 or 2 with the proviso that when c+2 then X is alkyl;

L is at each independent occurrence a sigma donor stabilizing ligand;

m=1 to 2 inclusive; and

A is an anion.

12. The process in accordance with claim 11 wherein the chromium compound has the formula:

$$(C_5(R')_5)_a CrX_2 L.$$

13. The process in accordance with claim 12 wherein ($C_5(R')_5$) is pentamethylcyclopentadienyl.

* * * * *

UNITED STATES PATENT AND TRADEMARK OFFICE
CERTIFICATE OF CORRECTION

PATENT NO.     : 6,583,241 B1
DATED          : June 24, 2003
INVENTOR(S)    : David L. Beach et al.

It is certified that error appears in the above-identified patent and that said Letters Patent is hereby corrected as shown below:

<u>Column 13,</u>
Line 40, delete "condition" and insert -- conditions --.

Signed and Sealed this

Nineteenth Day of August, 2003

JAMES E. ROGAN
*Director of the United States Patent and Trademark Office*